United States Patent [19]

Weverka

[11] Patent Number: 5,339,186
[45] Date of Patent: Aug. 16, 1994

[54] OPTICAL DATA PACKET COMPRESSOR/DECOMPRESSOR

[75] Inventor: Robert T. Weverka, Boulder, Colo.

[73] Assignee: The University of Colorado Foundation, Inc., Boulder, Colo.

[21] Appl. No.: 976,089

[22] Filed: Nov. 13, 1992

[51] Int. Cl.$^5$ .............................................. H04J 14/08
[52] U.S. Cl. ..................... 359/140; 359/135; 370/109; 250/227.12
[58] Field of Search ........ 359/140, 138, 135, 201–202, 359/850; 250/227.12; 370/109

[56] References Cited

U.S. PATENT DOCUMENTS

| | | | |
|---|---|---|---|
| 3,506,834 | 4/1970 | Buchsbaum et al. | 359/140 |
| 3,521,068 | 7/1970 | Armstrong et al. | 359/140 |
| 3,597,047 | 8/1971 | Carbrey | 250/199 |
| 3,838,278 | 9/1974 | Duguay et al. | 250/227 |
| 3,892,468 | 7/1975 | Duguay | 250/271.12 |
| 4,090,779 | 5/1978 | McNaney | 350/385 |

FOREIGN PATENT DOCUMENTS

| | | | |
|---|---|---|---|
| 0048047 | 3/1982 | European Pat. Off. | 359/140 |
| 0008511 | 1/1978 | Japan | 359/140 |
| 0120797 | 6/1987 | Japan | 359/140 |

OTHER PUBLICATIONS

"Time Multiplexing System", Kagan, M. R., IBM Technical Disclosure Bulletin, vol. 13, No. 9, Feb., 1971. p. 2484.

Primary Examiner—Richard E. Chilcot, Jr.
Assistant Examiner—K. Negash
Attorney, Agent, or Firm—Francis A. Sirr; Earl C. Hancock

[57] ABSTRACT

Apparatus for time modifying, or expanding, a serial optical signal that comprises a plurality of light pulses located in bit cells. A plurality of light reflectors establish a plurality of optical delay paths, one path for each light pulse. Each path provides a progressively greater delay time. A scanner operates in synchronism with the bit cell frequency of the optical signal, and sequentially switches each light pulse to the input of a corresponding delay path. A serial output is associated with the output of the plurality of delay paths, and operates to assemble the output pulses into an output optical signal having a like plurality of light pulses. The time separation or bit cell frequency of the output optical signal is greater than the bit cell frequency of the input optical signal. The apparatus operates in the reverse manner to provide time compression of an optical signal, and provides an output optical signal having a shorter bit cells interval than the bit cell interval of the input optical signal.

20 Claims, 4 Drawing Sheets

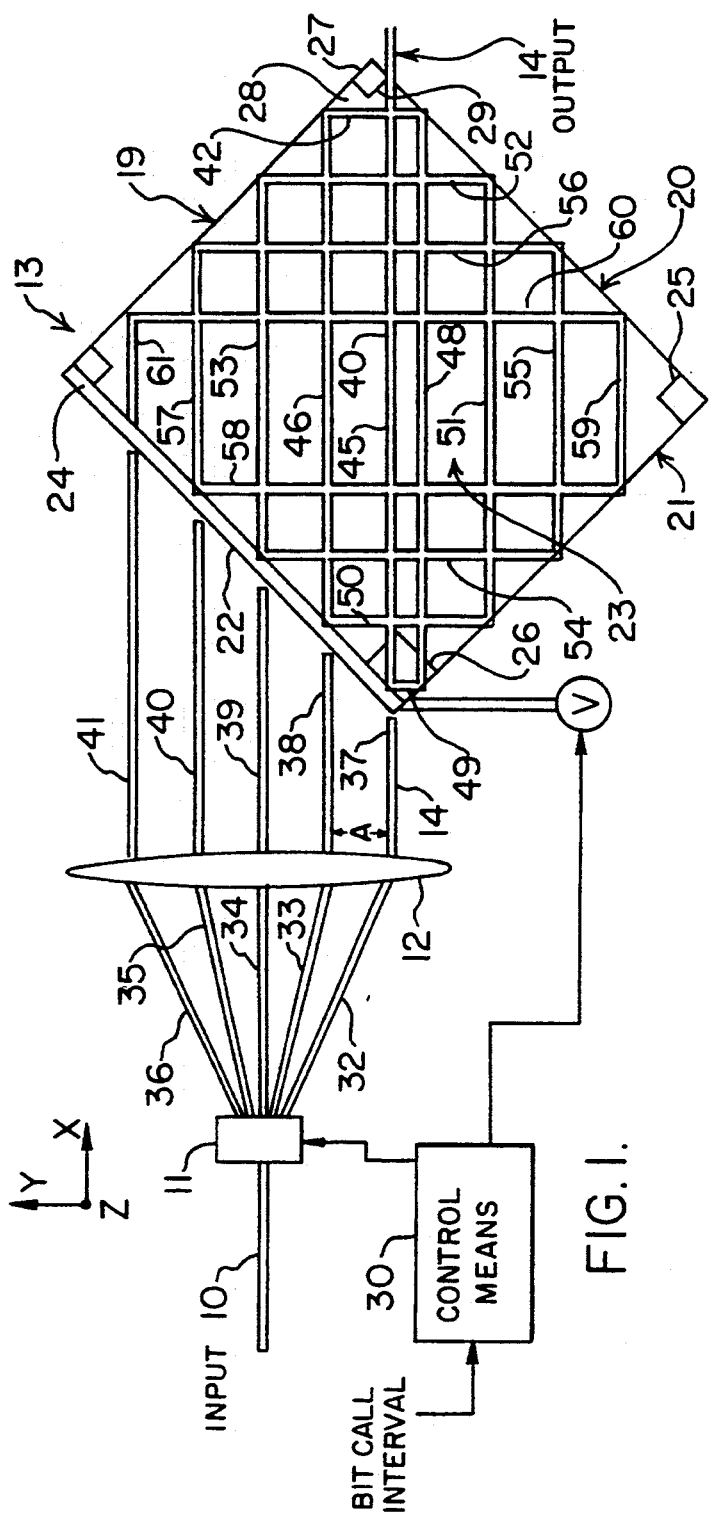
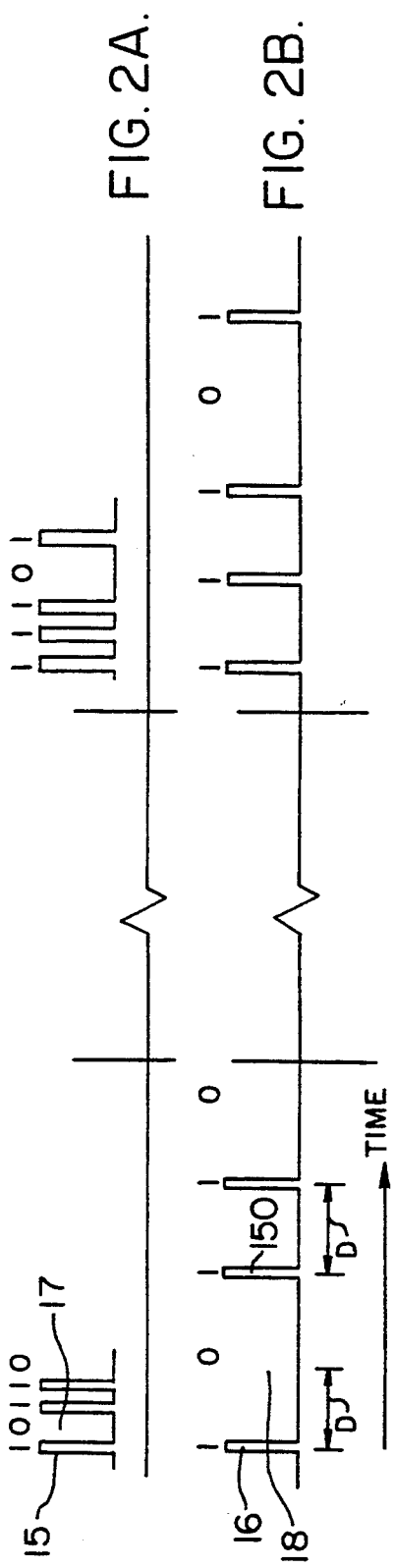

OPTICAL DATA PACKET COMPRESSOR/DECOMPRESSOR

BACKGROUND OF THE INVENTION

1. Field of the Invention

This invention relates to optical systems and elements, and more specifically, to apparatus for changing the bit cell interval or frequency of a serial optical data packet comprising light pulses that are sequentially located in bit cells.

2. Description of the Prior Art

The art of optical systems and elements includes various devices that provide multiple optical paths.

U.S. Pat. No. 3,506,834 provides a time division multiplex optical transmission system wherein an input laser beam is sequentially deflected to a plurality of individual beam positions that form a diverging cone. A first deflector is located at the apex of this diverging cone. A first lens is located at the base of this diverging cone. This first lens accepts the individual beams, and forms them into a like plurality of parallel beams in the form of a cylinder. A modulator is provided at the location of each of these parallel beams. In this way, information is imparted to each individual parallel beam. A second lens accepts the plurality of modulated parallel beams, and operates to form a like plurality of beam positions that take the shape of a converging cone. The second lens is located at the base of this converging cone. A second deflector is located at the apex of this converging cone. The second reflector is position synchronized with the first reflector, and operates to form the plurality of beams into a single output beam. U.S. Pat. No. 3,597,047 describes a light beam deflector that provides multiple reflection and includes an electrooptic crystal whose index of refraction is controlled as a function of the magnitude of an input analog signal. When this device operates as an analog-to-digital coder, the analog signal is applied to the crystal to control its index of refraction as a function of the magnitude of the analog signal. A beam of light now enters the crystal, is refracted thereby, and then exits the crystal. Depending upon the magnitude of the analog signal, the beam is usually reflected by a mirror arrangement so as to reenter the crystal. In this way, the beam of light makes multiple passes through the crystal, the beam being refracted during each pass as a function of the magnitude of the analog signal. The beam continues to pass through the crystal until the beam has been moved to a position where, when it exits the crystal for the last time, the beam misses the mirror arrangement, and passes on to a two-dimensional planar detector array. The individual detector position at which the beam strikes the array is a function of the magnitude of the analog signal, and the output of this individual detector provides a digital indication of this analog magnitude.

U.S. Pat. No. 3,838,278 describes an optical switching network that operates to gate an optical input pulse to one of a plurality of outputs. The input pulse is first divided into a plurality of identical pulses. Each of these individual pulses is then applied to the input of one of a plurality of optical delay means (in the form of optical fibers of different lengths), each providing a different delay for its input pulse. The output of each optical delay means is associated with one of the plurality of photodetector outputs. Selection of an individual photodetector enables the original input optical pulse to appear as a delayed electrical output pulse, the magnitude of the delay being that which is associated with the selected photodetector. If the variable delay that occurs between the various outputs is undesirable, the patent states that a complementary optical delay network can be inserted prior to the plurality of photodetectors, or complementary electrical delay networks can be inserted after the photodetectors.

U.S. Pat. No. 4,090,779 describes a light beam position control system having a cube that receives a beam of light incident on one surface thereof. The beam enters the cube and reflects internally of the cube, forming a spiral path that extends down the width of the cube. The beam then emerges from a surface of the cube. The first cube surface to internally receive the beam includes a control means that operates to modify the internal reflection angle of the beam. This modifies the beam's internal spiral path, and causes the beam to emerge from the cube at a position that is controlled by operation the control means.

SUMMARY OF THE INVENTION

High speed optical communication systems, for example, fiber optic communication systems, provide transmission of light pulses having a short bit cell interval within the optical communication system itself. In addition, in an optical data packet switching network, any one network node sends and receives high speed, multiple bit, data packets having a relatively long time interval between each of the individual data packets.

A data rate mismatch exists because the communication system's high frequency bit cell interval and the lower frequency bit cell interval of currently-available light pulse receivers and transmitters, i.e., those devices that are located at the input and output respectively of the optical transmission system.

In order to use the high data rate capability of the optical communication system, and to also use conventional receivers and transmitters at the output/input thereof, it is necessary to compress an optical data packet prior to launching the packet into the optical communication system, and to thereafter decompress the data packet as it exits the optical communication system.

In an exemplary high speed optical data packet switching network, an electronic transmitter sends a series of time compressed, time-separated data packets into the input of the communication system. Each packet fills a narrow time slot on the communication system. Decompression of the data packet at the communication system output is possible due to the relatively long time interval that exists between these data packets.

An object of the present invention is to provide apparatus for selectively time expanding or time compressing an N-bit optical signal by providing N optical delay paths, each path providing a progressively greater time delay from path 1 to path N. In the compression mode of operation, the delay paths are used in the sequence path N to path 1, to thereby provide progressively less time delay from input pulse 1 to input pulse N. In the decompression mode of operation, the delay paths are used in the sequence path 1 to path N, to thereby provide progressively greater time delay from input pulse 1 to input pulse N.

Each pulse of an input optical signal is switched to the input of its delay path in synchronism with the high bit cell frequency of the optical communication system.

In the compression mode of operation, an output is associated with the N delay paths, and operates to assemble the delayed pulses into a serial N-bit output signal, the time separation, or bit cell, interval of the output signal being less than bit cell interval of the input optical signal. In the decompression mode of operation, an output is associated with the N delay paths, and operates to assemble the delayed pulses into a serial N-bit output signal, the time separation or bit cell interval of the output signal being greater than bit cell interval of the input optical signal.

The device of this invention, operating in its data compression mode, provides data compression prior to presenting the serial data packet to the input of an optical communication system. At the receiver, or output end of the communication system, the device of this invention operates in its decompression mode to decompresses the data packet prior to presenting the data packet to a receiver, for example, to a device for detecting the packet's data content. A number of such transmitting and receiving stations may be time multiplexed on the optical communication system, thus providing high data throughput.

The present invention provides data compression/decompression without significant power change, as the width and amplitude of the light pulses are not changed during compression/decompression.

In preferred embodiments of the invention, the above-mentioned delay paths are established by an optical reflection cavity, or storage ring, which sequentially displaces each light pulse as the pulse traverses the cavity. One wall of the reflection cavity, or storage ring, is formed by an electrooptic reflector that is selectively switched between a transmitting state (i.e., a non-reflective state) and a reflective state.

In the data compression mode, the electrooptic reflector is controlled at the high bit cell frequency to allow light pulses to exit the cavity as a compressed data packet. In the data decompression mode, the electrooptic reflector is controlled at the high bit cell frequency to allow light pulses to enter the cavity for decompression thereof.

As a feature of the invention, an optical light pulse scanner operates to match the incident angle of the light pulses to the angle of acceptance of the optical fiber an the optical communication system.

These and other objects and advantages of the invention will be apparent from the following detailed description of the invention, which description makes reference to the drawing.

BRIEF DESCRIPTION OF THE DRAWING

FIG. 1 shows a first embodiment of the invention, and comprises an optical input path, a light pulse scanner, an optical lens, an optical delay means in the form of a four-wall reflection cavity, and an optical output path.

FIGS. 2A and 2B show exemplary input and output light pulse data groups, or packets, that are respectively received by, and generated by, devices constructed and arranged in accordance with the invention when the devices operate in their data decompression mode of operation.

DETAILED DESCRIPTION OF THE PREFERRED EMBODIMENT

Figure 3:
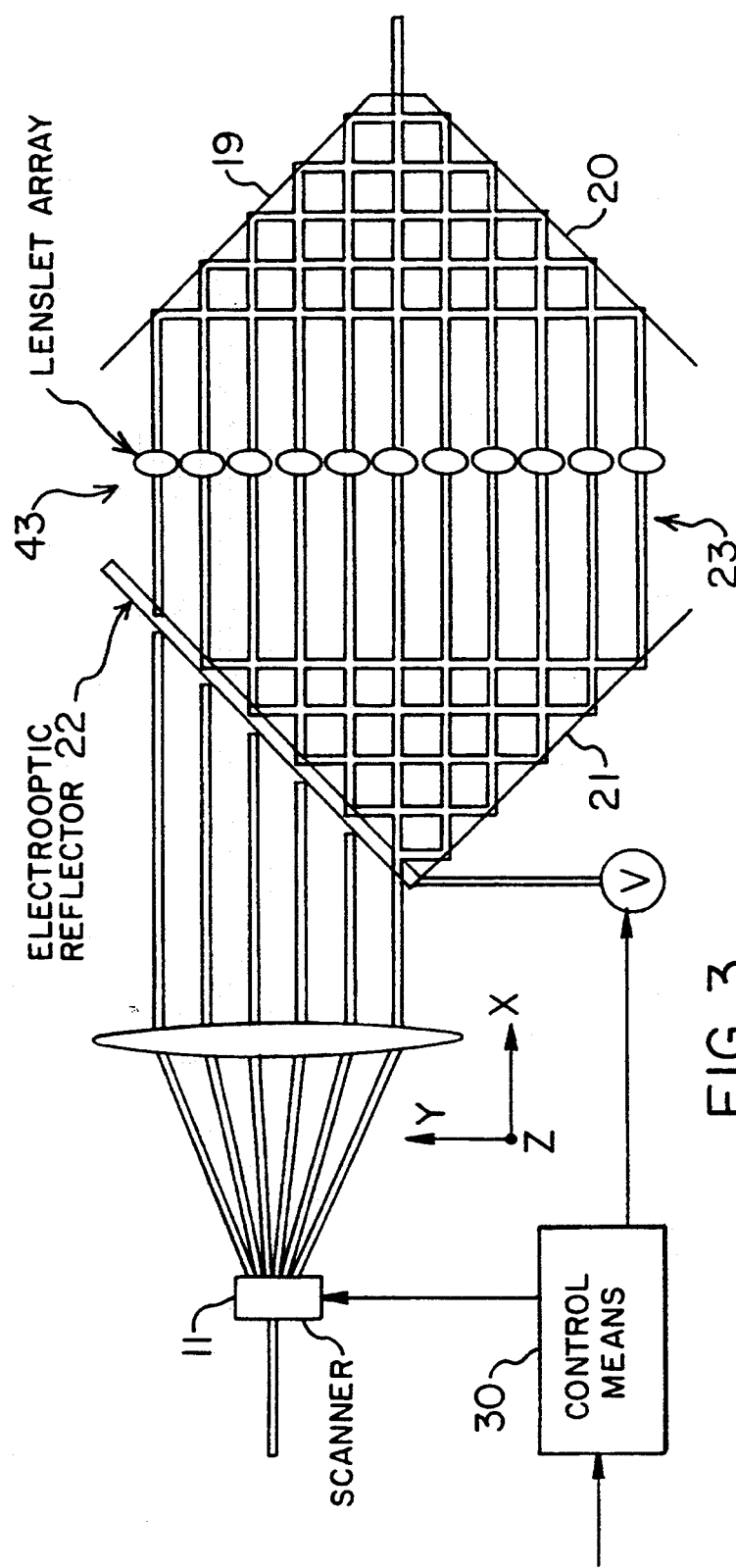
FIGS. 3 and 4 show embodiments of the invention that are based upon the general construction shown in FIG. 1 wherein the reflective cavity thereof includes a lenslet array and a pair of lens, respectively.

FIG. 1, which shows a first embodiment of the invention, comprises an optical input, or input path 10, a light pulse scanner 11, an optical lens 12, an optical delay means 13, and an optical output or output path 14. As will be apparent, designation of 10 as the input and 14 as the output defines the decompression mode of operation of the invention. For example, input path 10 may comprise the output of a high data rate fiber optic optical communication system that operates to supply data packets of the type shown in FIG. 2A.

In the compression mode of operation of the invention, 14 is designated as the input, and 10 is designated as the output, in which case, the low data rate signal of FIG. 2B is supplied to input 14. In this reverse direction, a cylindrical lens can be used to replace the scanner that is shown, in which case, fan-in loss to the optical communication system may be suffered.

Optical delay means 13 comprises three planar mirrors 19–21 of conventional construction, and one electrically controllable planar mirror 22. In operation, mirrors 19–22 form a rectangular-shaped optical delay cavity 23 that selectively receive a light pulse that pass through mirror 22 when this mirror is in its transmissive state, and thereafter operates to delay the light pulse by means of multiple reflections within cavity 23, during which time mirror 22 is controlled to be in its reflective state.

FIG. 1 contains an X-Y coordinate axis designation. The plane of FIG. 1 lies in this X-Y plane. The X direction is the direction of light pulse propagation thru cavity 23. Light pulses pass left to right for data decompression, and to the left for data compression. The Y direction in FIG. 1 is a direction that is normal, or transverse the direction of light propagation. The planes of mirrors 19–22 extend normal to this X-Y plane, and in the preferred embodiments of the invention, the mirrors extend at angles that are 45-degrees to the X axis. The major axis of lens 12 extends in the Y direction, and the optical axis of the lens extends in the X direction, generally as shown by path 39.

The reflective surfaces of mirrors 19–22 face inward, as will be apparent. Mirror 22 is an electrooptic mirror that is selectively placed in a state to transmit a light pulse therethrough, or to reflect a light pulse therefrom, as will be apparent. Mirrors 19–22 are shown in a side, or edge view and, as stated, all mirrors comprise flat planes that extend normal to the plane of FIG. 1. Mirrors 19–22 are physically arranged to define a three-dimensional, four-wall, time delay cavity 23, cavity 23 having four internal reflective surfaces, 22 of which are controllable, which mirrors form four right angles 24–27, as is apparent when cavity 23 is viewed in the plane of FIG. 1.

Figure 4:
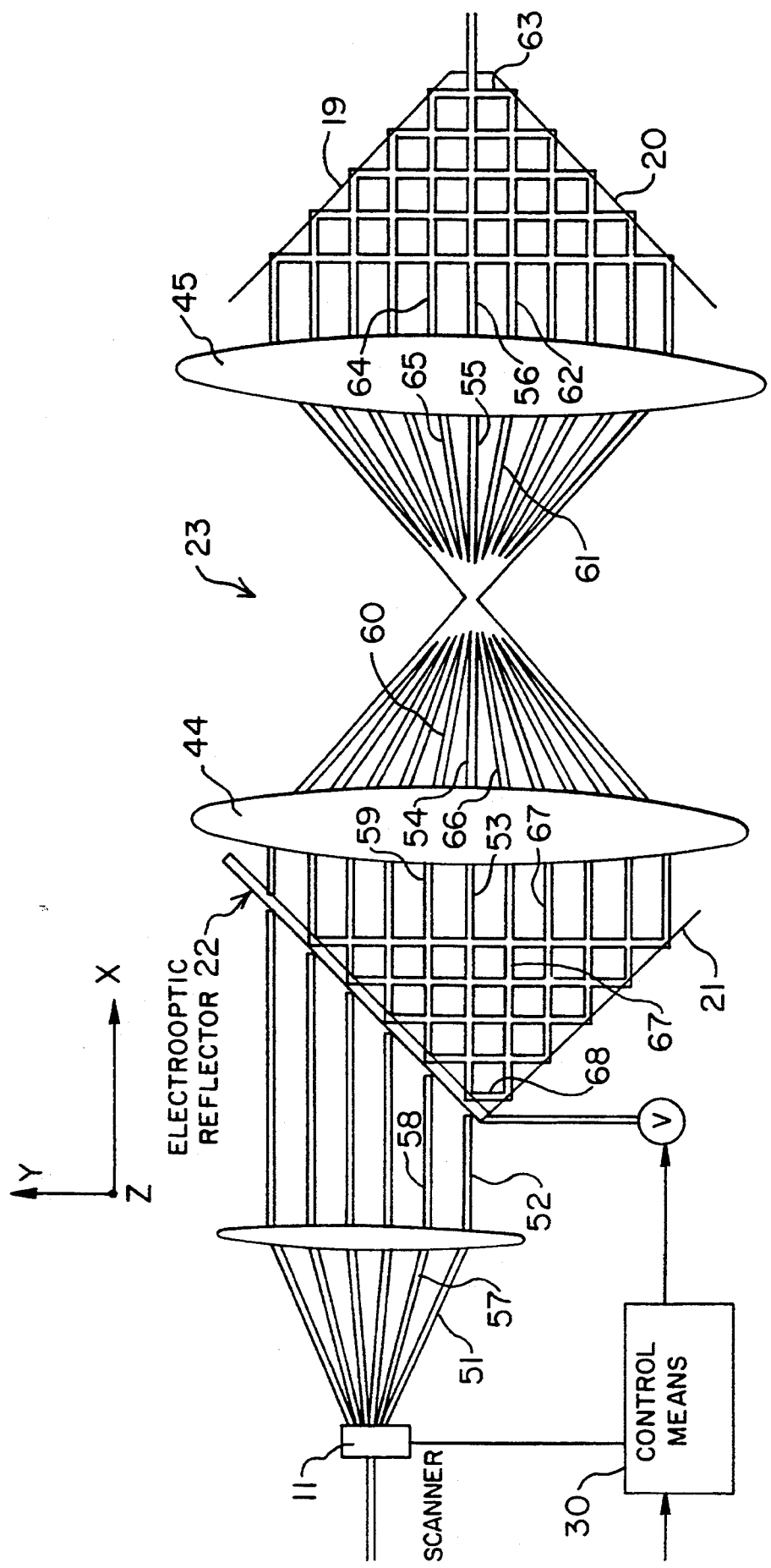

Without limitation thereto, in FIG. 1, the adjacent edges of mirrors 19 and 22 are shown as physically engaging at right angle 24, the adjacent edges of mirrors 21 and 22 are shown as physically engaging at right angle 26, and the adjacent edges of mirrors 21 and 20 are shown as physically engaging at right angle 25. The dotted lines associated with right angle 27 denote that this right angle is a virtual right angle, since the adjacent edges 28 and 29 of mirrors 19 and 20, respectively, do not physically engage; i.e., an exit gap, or aperture, is provided therebetween to provide the optical path that comprises device output 14. Within the teachings of this invention, angles 24–26 may also comprise virtual angles rather than the physical angles, as shown. FIGS. 3 and 4 show such embodiments of the invention wherein scanner 11 operates in a six-bit scanning cycle.

The type of optical medium contained within cavity 23 is not critical to the invention. For example, this medium may comprise air or glass, or a combination of a number of optical mediums. For example, the six-bit scanner cycle devices of FIGS. 3 and 4 provide embodiments of the invention wherein cavity 23 includes a lenslet array 43 and a pair of lens 44,45, respectively. The optical axes of the lens array of FIG. 3 extend in the X direction, and the major axes thereof extend in the Y direction. The optical axis of the two FIG. 4 lenses extend in the X direction, and the major axes thereof extend in the Y direction.

Operation of the invention is apparent by comparing the two optical data packets shown in FIGS. 2A and 2B. It is to be noted that the width and the amplitude of each light pulse bit in FIGS. 2A and 2B are the same.

When apparatus in accordance with the invention (for example, FIG. 1), receives a serial group, or packet, of compressed optical data pulses, as shown in FIG. 2A at its input 10, the bit cell interval is expanded, or decompressed in time, to thereby produce the pulse groups shown in FIG. 2B at device output 14. Alternately, when the group of pulses shown in FIG. 2B are received at device output 14, the pulse group shown in FIG. 2A appears at device input 10 as a time compressed pulse group.

In FIGS. 2A and 2B, two exemplary five-bit optical binary signals "10110" and "11101", each comprising 5 bit cells, are expanded or compressed, depending upon the direction in which an optical signal is presented to apparatus in accordance with the invention. The FIG. 2A to FIG. 2B expansion/decompression occurs when the signal of FIG. 2A is presented to the input of the invention, and the FIG. 2B to FIG. 2A compression occurs when the signal of FIG. 2B is presented to the output of the invention, the output acting as the input.

Without limitation thereto, the presence of a light pulse, such as 15 in FIG. 2A and 16 in FIG. 2B, denotes transmission of a binary 1, whereas the absence of a light pulse, such as during bit cells 17 and 18, denotes transmission of a binary 0.

While FIGS. 2A and 2B show the transmission of five-bit signal packets, the invention is not to be limited to this specific signal packet configuration. That is, the exemplary number 5 can, in fact, be any integer number N, and in FIGS. 3 and 4, six-bit packets are transmitted.

As stated, FIG. 1 shows the first embodiment of the invention. Considering the signal expansion mode of operation, the signal of FIG. 2A is applied to device input 10. Input 10 comprises, for example, the output end or termination of a fiber optic transmission cable.

By means of electronic timing contained within control means 30, scanner 11 operates so that as each input bit cell of each five-bit signal packet of FIG. 2A occurs, the binary content of the bit cell (i.e., a binary 1 or a binary 0) is sequentially directed in a repeating five-bit fanning pattern across lens 31. In other words, control means 30 is controlled in accordance with the high data rate bit cell interval of the FIG. 2A optical pulse train, or packet, that is emitted from, or received by, input 10 during its decompression mode of operation. The repeating fanning pattern of scanner 11 comprises the repeating and sequential light paths 32–36.

Considering the first five-bit signal packet "10110" of FIG. 2A, light pulse 15 thereof is first presented to path 32. Since the content of the second bit cell 17 of this first signal packet is "0", no light pulse is presented to path 33 at the time of occurrence of the second bit cell. In a like manner, light path 34 receives a light pulse, light path 35 receives a light pulse, and light path 36 does not receive a light pulse, at the time of the third, fourth and 50-bit cells, respectively, of the first signal packet shown in FIG. 2A.

Lens 31 operates to provide five parallel output light paths 37–41, corresponding to the five scanner generated light paths 32–36, respectively. Lens 31 is, for example, a hyperbolic planar convex lens, or a sphero-elliptic lens.

Control means 30 controls electrooptic reflector 22 so that reflector 22 either passes light pulses from paths 37–41 through reflector 22, or reflector 22 is shifted, or controlled, to its reflective mode in accordance with the bit cell interval of the input light pulse packet, as is well known to those of skill in the art. In this manner, the initial FIG. 2A light pulse 15 passes directly through paths 32 and 37, through reflector 22 and light path 42, to appear as pulse 16 at device output 14.

Since the next input bit cell contains a binary 0, no light is presented to the then transparent reflector 22. However, for purposes of explanation, assume that the second input bit cell contained a binary 1, the next, or second, light pulse would then traverse path 33, path 38, through reflector 22, light paths 46–49, and light path 42 to appear as an output light pulse at device output 14 in bit cell 18 of FIG. 2B. This second light pulse would, accordingly, be delayed by a time interval D (see FIG. 2B) relative to the first light pulse. This time interval, or distance D, comprises the bit cell center-to-center interval, or distance, of the FIG. 2B signal.

Note that reflector 22 is controlled to be in its transmissive mode only during the short time interval that the second light pulse passed therethrough on its way from light path 38 to light path 46. At the time that the second light pulse passes from path 49 to path 42, reflector is controlled to be in its reflective mode, thus causing the second light pulse to be reflected to path 47 and to output 14.

In a similar manner, input light pulses (i.e., binary 1's) of the input optical data packet shown in FIG. 2A are time delayed by multiple reflections within cavity 23, to thereby exit cavity 23 at 14 in the decompressed output bit cells that are shown in FIG. 2B. Assuming a "11111" input light pulse data packet (i.e., five consecutive light pulses), each light pulse is delayed by the time interval D relative to its preceding light pulse as the light pulse traverses cavity 23 in its X and Y directions.

Note that the invention produces data compression by controlling electrooptic reflector 22 and scanner 11 so that decompressed pulse packets of the type shown in FIG. 2B are compressed into pulse packets of the type shown in FIG. 2A. This is done by directing the first light pulse 16 of the FIG. 2A packet through the longest path that exists within cavity 23 (i.e., through path 14, 47, 49, 48, 47, 46, 50-61). At the end of path 61, the first pulse 16 passes through reflector 22. At the time that the light pulse traverses path 61, reflector 22 is controlled by means 30 so as to be in its transmissive mode, and scanner 11 is controlled by means 30 to sample light path 41,36.

The second light pulse 50 of the FIG. 2A light pulse packet to be compressed is now controlled to pass through the next path that exists within cavity 23 (i.e., through path 14, 47, 49, 48, 47, 46, 50-57). Again, this second pulse 50 passes through reflector 22 at the time that reflector 22 is controlled by means 30 so as to be in its transmissive mode, and scanner 11 is controlled by means 30 to sample light path 40,35 at this time.

In this manner, scanner 11 operates to sequentially sample each of its paths, or channels, in the sequence 36-32 for each decompressed 5-bit input data packet that is applied to now-input 14.

The embodiment of FIG. 3 is operationally the same as FIG. 1, with the exception that a plurality of individual lenses 43 are provided to form a lenslet array, this array operating to refocus each light pulse as it passes through its light cavity channel, or path, thereby eliminating or minimizing loss of light pulse definition.

The embodiment of FIG. 4 operates essentially the same as FIG. 1, with the exception that dual intermediate lenses 44,45 are included within cavity 23, so as to further extend the length of the horizontal, or X, direction optical paths within cavity 23 (for example, if a greater delay D is desired).

In the device of FIGS. 1 and 2, a five-bit optical signal is shown. For this type of a device in accordance with the invention with mirrors 19-22 that are about 2 cm in length, as measured in the plane of FIG. 1, with an index of refraction of the medium within cavity 23 equal to 1 (i.e., the medium is air), and where the wavelength of the light present in the light pulses is 1 micrometer, the number of resolvable bits that can be handled in each data packet generally equals 14.

FIGS. 3 and 4 show devices that overcome packet bit-length limitation that may exist in the FIG. 1 device due to diffraction and the like. In FIG. 3, lenslet array 43 provides one lens for each X direction horizontal light path that exists within cavity 23, each lens operating to refocus any light diffraction to the center of the following reflector.

FIG. 4 shows a two lens device which accomplishes the same function. For example, in the FIG. 4 device, and while operating in the data decompression mode, the first input light pulse (assume a binary 1) traverses path 51-56, whereas the second input light pulse (also assume a binary 1) traverses the path 57-68,51-56.

In terms of the spirit and scope of the invention, as represented by FIGS. 1, 3 and 4, the apparatus provides a means for modifying the bit cell interval of an binary optical signal comprising N bit cells that are numbered bit cell 1 through bit cell N. The apparatus includes an optical reflection cavity 23 whose construction defines a light propagation axis X. The cavity has first, second, third, and fourth planar light reflectors 19-22 that are arranged to form a rectangle having a diagonal that is generally coincident with the X axis. The reflective surfaces of all reflectors face inward, and entry/exit reflector 22 is controllable between a light transmissive state and a light reflective state. An edge of reflector 22 is generally coincident with, and extends generally normal, to the X axis. N optical reflection paths extend internal of cavity 23 between mirrors 19-22. These internal reflection paths are of progressively greater length from internal path 1 to internal path N, internal path 1 (i.e., path 47 of FIG. 1) being generally coincident with the X axis and having an exit/entry extension 14 that extends out of cavity 23. All of the remaining internal paths 2 through N including internal path 47 and extension 14 as an end portion thereof. A scanner means 11,31 establishes a plurality N of Y-displaced paths (i.e., 37-41) that are external to cavity 23 and extend parallel to the X axis, external path 1 (i.e., 37) being generally coincident with the X axis, and external paths 2-N (i.e., 38-41) being spaced generally equal greater distances from the X axis. A control means 30 controls scanner means 11,31 and reflector 22 in a manner to sequentially render reflector 22 transmissive, and to control scanner means 11,31 to sequentially establish external paths 37-41 in synchronism with a compressed data rate bit cell interval.

Figure 5:
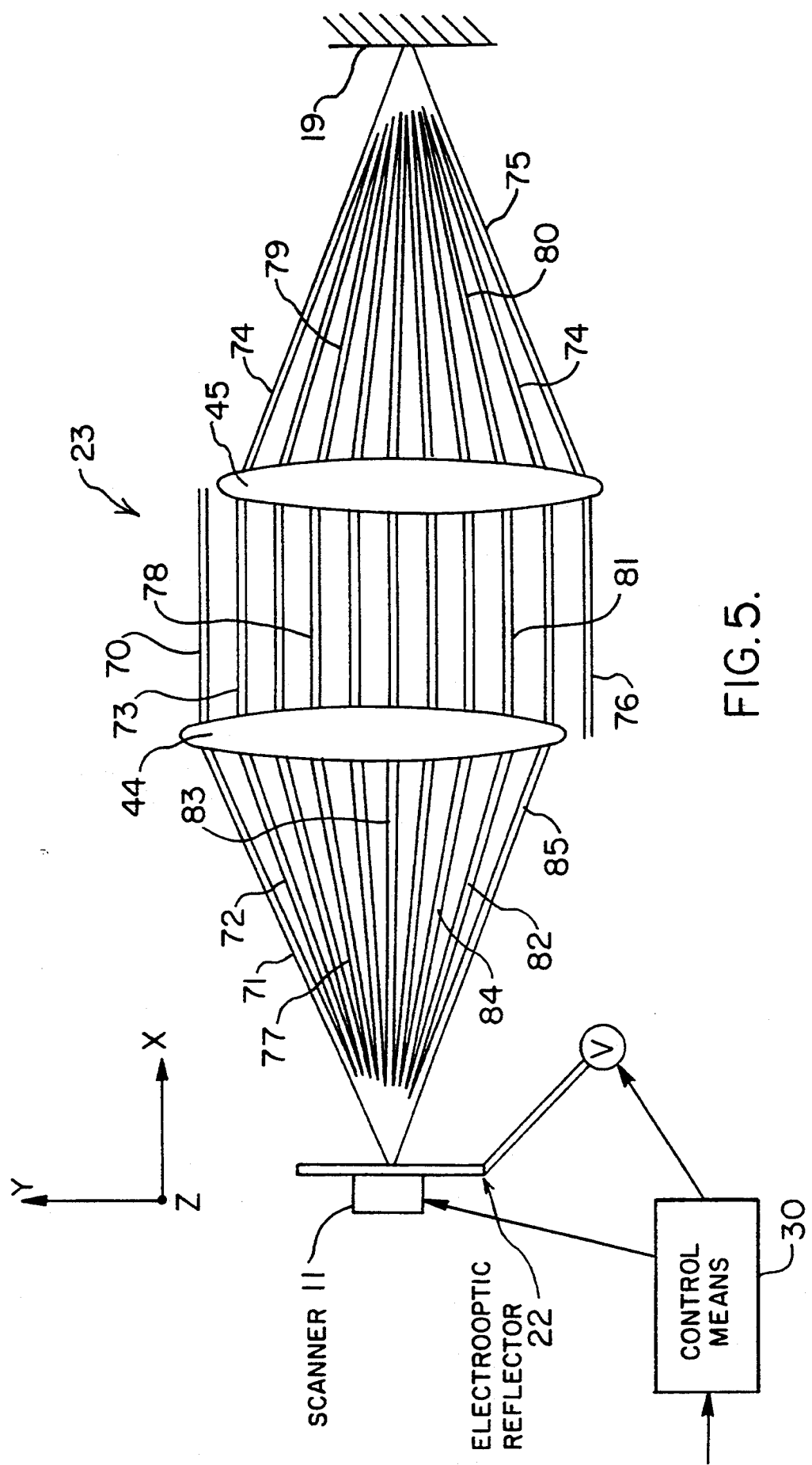
FIG. 5 shows a further embodiment of the invention having a two-wall reflection cavity.

The embodiment of the invention shown in FIG. 5 has the same general properties as the embodiment of FIG. 4. In FIG. 5, path 70 identifies the device input when operating in the data decompression mode, and the device output when operating in the data compression mode. As will be apparent, but without limitation thereto, the device of FIG. 5 is configured to handle five-bit data packets.

The device of FIG. 5 is provided with a planar mirror, numbered 19, that extends parallel to the plane of electrooptic mirror 22. The plane of mirrors 19,22 extend parallel to the Y-Z plane of the disclosed X-Y-Z coordinate system. The two lens 44,45 are of the FIG. 4 type. The major axes of these two lenses extend in the Y direction, and the optical axes of the lenses extend the X direction, but are offset in the Y direction on opposite sides of the central X axis of cavity 23, as shown.

For purposes of explanation, assume a compressed input data packet of "11111", i.e., each bit cell contains a light pulse. The first pulse of light traverses path 70,71, passes through electrooptic mirror 22 in its transmissive mode, and is directed back through mirror 22 to path 72 by operation of scanner 11. As with previous embodiments of the invention, mirror 22 and scanner 11 are controlled by control means 30 in accordance with the data rate or bit cell interval of the compressed input data packet. This first light pulse now passes through lens 44, and path 73, lens 45, path 74, is reflected off of mirror 19, and passes through path 75 to device output path 76. Path 76 comprises the device input in the data decompression mode.

The second input light pulse again traverses path 70,71, passes through electrooptic reflector 22 in its transmissive mode. However, scanner 11 is controlled to directed this second light pulse back through mirror 22 to path 77. This second light pulse now passes through lens 44, path 78, lens 45, path 79, mirror 19, path 80, lens 45, path 81, lens 44, path 82, mirror 22 in its reflective mode, thereafter retracing the path of the first light pulse through path 72, lens 44, path 73, lens 45, path 74, mirror 19, and path 75 to output path 76.

In a like manner, it can be shown that the third input light pulse is directed to path 83 by operation of scanner 11, the fourth light pulse is directed to path 84, and the 50, and last light pulse of the data packet, is directed to light path 85. Each succeeding light pulse first traces its own unique initial path, as demonstrated above relative to the second light pulse, and then retraces the path to the previous light pulses, this providing an additional delay for each light pulse. Again, if the time of arrival of the second light pulse at output path 76 is delayed by a time interval D from the time of arrival of first light pulse at path 76, the third light pulse is delayed by the interval 2D, the fourth light pulse is delayed by the interval 3D, and the 50 and last light pulse is delayed by the interval 4D.

As with previous embodiments of the invention, the embodiment of FIG. 5 operates in a compression mode when a decompressed optical pulse packet is applied to path 76 as the device input. The first pulse of this input packet is controlled to traverse the longest path within cavity 23, each pulse traversing a progressively shorted path, until the last pulse of the input packet is controlled to traverse the shortest path.

In terms of the spirit and scope of the invention as represented by FIG. 5, the apparatus of FIG. 5 provides apparatus for modifying the bit cell interval of an binary optical signal comprising N light pulses positioned within N bit cells. The construction of optical reflection cavity 23 defines a light propagation axis X. Cavity 23 includes first and a second planar and parallel light reflectors 19,22 that are spaced from each other along the X axis. The reflective surfaces of reflectors 19,22 face inward of cavity 23. Reflector 22 is controllable between a light transmissive state and a light reflective state. N optical reflection paths are provided internal of cavity 23, and extending between reflectors 19,22, the internal reflection paths being of progressively greater length from internal path 1 to internal path N, and internal path 1 having an extension 76 that extends external of cavity 23, and all of the internal paths 2 through N including internal path 1 and its extension 76 as an end portion thereof. Scanner means 11 is mounted on the other side of reflector 22 from reflector 19. Scanner means 11 is operable to receive light pulses that pass through reflector 22 in its transmissive state, and to direct the light pulses back through reflector 22 in its transmissive state in a manner to sequentially establishing the N internal optical paths. A control means 30 controls scanner means 11 and reflector 22 in a manner to sequentially render reflector 22 transmissive, and to control scanner means 11 to sequentially establish the N internal optical paths in synchronism with the bit cells of a compressed binary optical signal.

Figure 6:
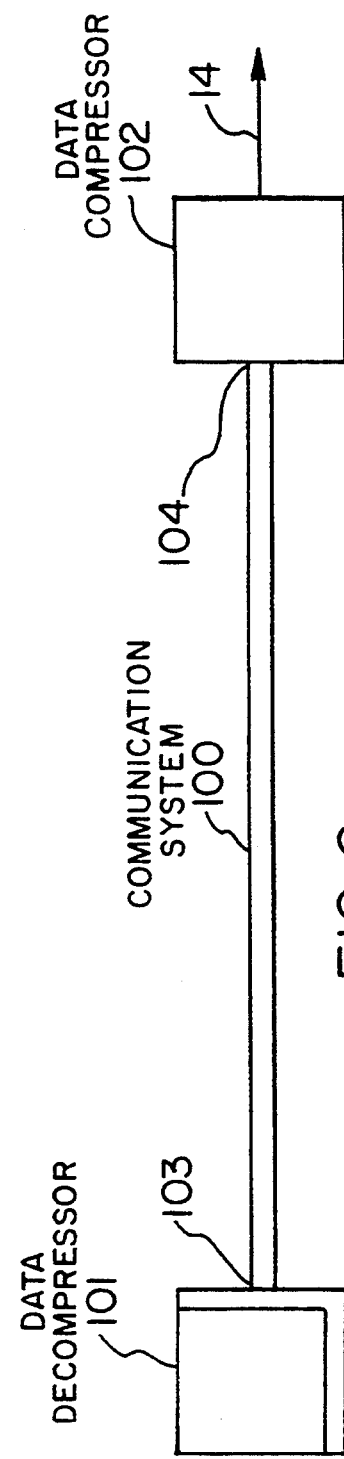
FIG. 6 shows an optical communication system having one device in accordance with the invention, operating as a data packet compressor, and transmitting compressed data packets into the input of the communication system, and having a second device in accordance with the invention operating as a data packet decompressor, and receiving compressed data packets from the output of the communication system.

FIG. 6 shows a bidirectional optical communication system 100, as previously described. When data packets are transmitted left to right in FIG. 6, one device 101, in accordance with the invention, operates as a data packet compressor and transmits compressed N-bit data packets into the end 103 of communication system 100. A second device 102 in accordance with the invention, operates as a data packet decompressor and receives compressed N-bit data packets from the end 104 of communication system 100, and operates to decompress the received data packets. The high bit cell frequency of communication system 100 can be defined as a base bit cell frequency. As described previously, each of the devices 101 and 102 provide N optical delay paths, each path providing progressively greater time delay from path 1 to path N. Data compressor 101 utilizes these delay paths in the sequence path N to path 1, to thereby provide progressively less time delay from light pulse 1 to light pulse N, and thereby sends compressed data packets to the end 103 of communication system 100. Data decompressor 102 utilizes its delay paths in the sequence path 1 to path N, to thereby provide progressively greater time delay from light pulse 1 to light pulse N of the data packet received from communication system 100. Again, devices 101 and 102 operate in synchronism with the base bit cell frequency.

When data is transmitted right to left in FIG. 6, device 102 operates as a data compressor and device 101 operates as a data decompressor.

The invention has been described in detail making reference to various embodiments thereof. However, since it is known that those skilled in the art will readily visualize other embodiments that are within the spirit and scope of the invention, it is intended that the invention not be limited by the foregoing detailed description.

What is claimed is:

1. Apparatus for time modifying an input optical signal comprising N individual light pulses that are time separated to occur in recurring pulse cells of uniform time interval, the light pulses being sequentially identified as pulse 1 to pulse N, the apparatus comprising;
    means for establishing a plurality N of individual optical delay paths numerically identified as delay path 1 to delay path N, and each of said delay paths providing an optical delay interval that is D units greater than the optical delay interval that is provided by the next lowest numbered delay path,
    scanner means and control means for said scanner means, said control means controlling said scanner means in synchronism with the pulse cell interval of said input optical signal, and said scanner means being operable to receive said input optical signal and to direct each of said N pulses to a corresponding one of said N delay paths, and
    an output path associated with said plurality of optical delay paths, and operable to sequentially assemble delayed pulses 1 to N, into an output optical signal, wherein the pulse cell interval of said delayed pulses is greater than the pulse cell interval of said input optical signal.

2. The apparatus of claim 1 wherein said input optical signal of N pulses is directed in sequence to said plurality N of optical delay paths in a reverse sequence, with pulse 1 being applied to delay path N, sequentially until pulse N is applied to delay path 1, so as to provide an output wherein the pulse cell interval of said output is less than the pulse cell interval of an input optical signal.

3. Apparatus for selectively decompressing/compressing a binary optical signal comprising N individual bit cells of uniform time interval, the apparatus comprising;
    an optical reflection cavity providing a plurality N of individual different length optical paths that are numbered path 1 through path N from the shortest length path 1 through the longest length path N, each path providing an optical time delay interval that is greater than the time delay interval that is provided by the previously-numbered path by a delay interval designated D,
    said cavity having first, second, third and fourth light reflectors that are arranged to form a rectangle, and the reflective surfaces of said reflectors facing inward of said rectangle, and
    said cavity operating in a data decompression mode when N sequential light pulses are applied to said optical paths in a cyclic sequence path 1 through path N, and said cavity operating in a data compression mode when N sequential light pulses are applied to said optical paths in a cyclic sequence path N through path 1.

4. The apparatus of claim 3 wherein said N optical paths are progressively longer by an equal length increment from path 2 through path N, said equal length increment establishing said delay interval D, said delay interval D establishing uniform bit cell intervals for decompressed data when said cavity is operating in said decompression mode, and said delay interval D establishing similar uniform bit cell intervals for data to be compressed when said cavity is operating in said compression mode.

5. Apparatus for modifying the bit cell interval of a binary optical signal comprising N bit cells numbered bit cell 1 through bit cell N, the apparatus comprising;

an optical reflection cavity defining a light propagation axis X, said cavity having first, second, third and fourth planar light reflectors that are arranged to form a rectangle having a diagonal that is generally coincident with said X axis, the reflective surfaces of said reflectors facing inward of said rectangle, a first of said reflectors being controllable between a light transmissive state and a light reflective state, and an edge of said first reflector being generally coincident with and extending generally normal to said X axis, said reflectors establishing N optical reflection paths internal to said reflection cavity and extending between the mirrors thereof, said internal reflection paths being of progressively greater length from internal path 1 to internal path N, internal path 1 being generally coincident with said X axis and having an extension that extends external of said reflection cavity, and all of internal paths 2 through N including internal path 1 and its extension as an end portion thereof, scanner means establishing a plurality N of paths that are external to said reflection cavity, are directed to intersect said first reflector, and extend parallel to said X axis, external path 1 being generally coincident with said X axis, and external paths 2 through N being spaced generally equal greater distances from said X axis, and control means for controlling said scanner means and said first reflector in a manner to sequentially render said first reflector transmissive, and to control said scanner means to sequentially establish said external paths in synchronism with the bit cell interval of the binary optical signal.

6. The apparatus of claim 5 wherein the plane of said reflectors extending at an angle of about 45-degrees to said X axis.

7. The apparatus of claim 6 for increasing the bit cell interval of an N-bit binary optical signal comprising bits numbered 1 through N, wherein the N bits of said binary optical signal are sequentially applied to said external paths in the sequence external path 1 through external path N in synchronism with the bit cell intervals of said optical signal, wherein said first reflector is momentarily rendered transmissive in synchronism with the bit cell intervals of said optical signal, and wherein an optical signal of increased bit cell interval is provided as an output from the extension of said internal path 1.

8. The apparatus of claim 6 for decreasing the bit cell interval of an N-bit binary optical signal comprising bits numbered 1 through N, wherein the N bits of said binary optical signal are sequentially applied to the extension of said internal path 1, wherein said scanner means is controlled in synchronism with said decreased bit cell interval to sequentially respond to said external paths in the sequence external path N through external path 1, wherein said first reflector is momentarily rendered transmissive in synchronism with said decreased bit cell interval, and wherein an N-bit optical signal of decreased bit cell interval is provided as an output sequentially from said external paths N through 1.

9. The apparatus of claim 5 including, lens means within said optical reflection cavity and having a major axis thereof extending generally normal to said X axis.

10. The apparatus of claim 9 wherein said lens means comprises a first and a second lens spaced from each other along said X axis, the major axes thereof extending generally normal to said X axis and being spaced on opposite sides of a second diagonal of said rectangle.

11. The apparatus of claim 9 wherein said lens means comprises a lenslet array whose major axis is generally coincident with a second diagonal of said rectangle.

12. Apparatus for modifying the bit cell interval of a binary optical signal comprising N light pulses positioned with N bit cells, the apparatus comprising;

an optical reflection cavity defining a light propagation axis X, said cavity having first and second planar and parallel mirrors spaced from each other along said X axis, said cavity having third and fourth planar and parallel mirrors spaced from each other along said X axis, the reflective surfaces of said first, second, third and fourth mirrors facing inward of said cavity, and said first mirror being controllable between a light transmissive state and a light reflective state, said mirrors establishing N optical reflection paths internal to said reflection cavity and extending between said mirrors, said internal reflection paths being of progressively greater length from internal path 1 to internal path N, internal path 1 having an extension that extends external of said reflection cavity, and all of internal paths 2 through N including internal path 1 and its extension as an end portion thereof, scanner means mounted on the other side of said first mirror from said second mirror, said scanner means being operable to receive light pulses that pass through said first mirror in its transmissive state, and to direct the light pulses back through said first mirror in its transmissive state in a manner to sequentially establishing said N internal optical paths, and control means for controlling said scanner means and said first mirror in a manner to sequentially render said first mirror transmissive, and to control said scanner means to sequentially establish said N internal optical paths in synchronism with said bit cells.

13. The apparatus of claim 12 including a first and a second lens mounted within said optical reflection cavity intermediate said first and second mirrors, said first and second lenses being spaced from each other along said X axis, said first and second lenses having parallel major axes that extend normal to said X direction, and said first and second lenses having optical axes that extend parallel to said X axis and are located on opposite sides thereof.

14. The apparatus of claim 13 for increasing the bit cell interval of an N-bit binary optical signal comprising bits numbered 1 through N, wherein the N bits of said binary optical signal are sequentially applied to said internal paths in the sequence internal path 1 through internal path N in synchronism with said bit cell intervals, and wherein an optical signal of increased bit cell interval is provided as an output from said internal path 1.

15. The apparatus of claim 13 for decreasing the bit cell interval of an N-bit binary optical signal comprising bits numbered 1 through N, wherein the N bits of said binary optical signal are sequentially applied to said internal paths in the sequence internal path N through internal path 1 in synchronism with said bit cell intervals, and wherein an optical signal of decreased bit cell interval is provided as an output from said internal path N.

16. A method for selectively providing bit cell compression or decompression of an input N-bit optical signal relative to a base bit cell frequency, comprising the steps of;

providing N optical delay paths, each path providing progressively greater time delay from path 1 to path N, in the compression mode of operation, utilizing said delay paths in the sequence path N to path 1, to thereby provide progressively less time delay from pulse 1 of said optical signal to pulse N of said optical signal, and in the decompression mode of operation, utilizing said delay paths in the sequence path 1 to path N, to thereby provide progressively greater time delay from pulse 1 of said optical signal to pulse N of said optical signal.

17. The method of claim 16 including the step of;

presenting each of said N bits of said optical signal to a delay path in synchronism with said base bit cell frequency.

18. The method of claim 17 including the steps of;

in the compression mode of operation, providing an output that is associated with said delay path N, and operates to assemble delayed bits of said optical signal into an N-bit output signal, the bit cell frequency equal to said base bit cell frequency, and in the decompression mode of operation, providing an output that is associated with said delay path 1, and operates to assemble delayed bits of said optical into a N bit output signal, the bit cell frequency of said output signal being lower than said base bit cell frequency.

19. The method of claim 18 including the steps of;

providing an optical communication system operating at a bit cell frequency substantially equal to said base bit cell frequency, in the compression mode of operation, utilizing said output signal as an input to said optical communication system, and in the said decompression mode of operation, utilizing said output signal as an output from said optical communication system.

20. The method of claim 19 including the step of;

establishing said N delay paths by the use of an optical reflection cavity which sequentially displaces each of the N bits of said optical signal as a bit traverses said cavity, providing said reflection cavity with an electrooptic reflector, in the compression mode of operation, controlling said electrooptic reflector at said base frequency to allow the N bits of said optical signal to sequentially exit said cavity as a compressed output, and in the decompression mode mode of operation, controlling said electrooptic reflector at said base frequency to allow the N bits of said optical signal to sequentially enter said cavity for decompression thereof.

* * * * *